United States Patent [19]

Sano et al.

[11] 4,248,410

[45] Feb. 3, 1981

[54] SUSPENSION SPRING DEVICE FOR A MOTOR VEHICLE

[75] Inventors: Shoichi Sano, Tokorozawa; Kunitaka Furuya, Kamifukuoka, both of Japan

[73] Assignee: Honda Giken Kogyo Kabushiki Kaisha, Tokyo, Japan

[21] Appl. No.: 48,466

[22] Filed: Jun. 14, 1979

[51] Int. Cl.³ .............................................. F16F 1/12
[52] U.S. Cl. ................................. 267/60; 267/177; 280/724
[58] Field of Search .............. 188/300; 267/22 R, 60, 267/64 B, 65 D, 175, 177; 280/701, 724

[56] References Cited

U.S. PATENT DOCUMENTS

| | | | |
|---|---|---|---|
| 2,534,575 | 12/1950 | Conley et al. | 267/60 X |
| 2,658,749 | 11/1953 | Alletto | 267/60 X |
| 4,118,020 | 10/1978 | Myers | 267/177 X |

FOREIGN PATENT DOCUMENTS 541800  10/1955  Belgium ....................... 267/60

*Primary Examiner*—Duane A. Reger
*Attorney, Agent, or Firm*—Haseltine and Lake

[57] ABSTRACT

The present invention discloses a suspension spring device having at least two suspension coil springs arranged in series between a vehicle body and wheels, the same interconnected through a spring adjusting cylinder disposed movably up and down relative to the body, and a lock device disposed on the body for restraining the upward and downward movements of the spring retaining cylinder.

4 Claims, 2 Drawing Figures

4,248,410

SUSPENSION SPRING DEVICE FOR A MOTOR VEHICLE

BACKGROUND OF THE INVENTION

The present invention relates to a suspension spring device for an automotive vehicle utilizing coil springs, in particular interrelationship, to attain a variable spring constant of the suspension system.

Generally, the suspension system of an automotive vehicle, where coil springs are utilized, is substantially constant. For this reason, a vehicle will typically ride hard where the number of passengers are small in number, and soft in instances where the passengers are large in number. It has however been found that an acute bump of the spring damper will not only give rise to an upward thrust phenomenon relative to the vehicle body but will also induce a change in attitude of the auto body and the consequent loss in stability of the vehicle. Consequently, the conventional suspension spring, with its constant spring constant, fails to satisfy needs for both comfort and performance in a car, without regard to the actual number of passengers therein.

The present invention may be viewed as a response to the above existent problems in the prior art.

SUMMARY OF THE INVENTION

The present invention relates to a suspension for spring device comprising at least two suspension coil springs arranged in series between the vehicle body and wheels, the interrelationship between said suspension of coil springs being accomplished through a spring retaining cylinder disposed movably upward and downwardly relative to the auto body, and a lock device disposed upon the body for restraining the upward and downward movements of said spring retaining cylinder.

It is an object of the present invention to provide a suspension spring device of a type which can, responsive to different loading conditions of the automobile, change the spring constant of the suspension system thereof in order to satisfy criteria of passenger comfort and stability of performance in motion.

DETAILED DESCRIPTION OF THE INVENTION

Figure 1:
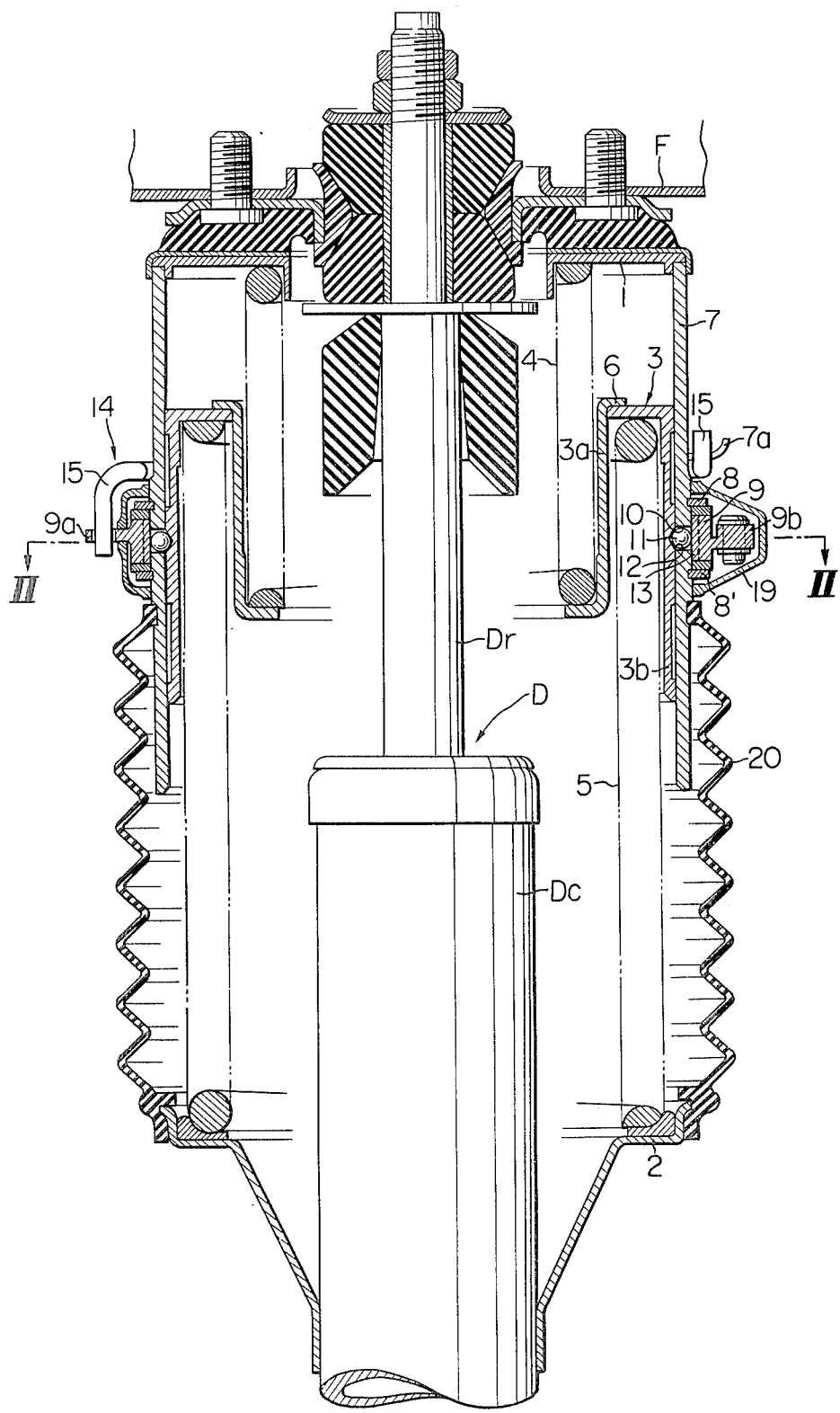
FIG. 1 is a longitudinal sectional view showing one embodiment of a device in accordance with the present invention.
Figure 2:
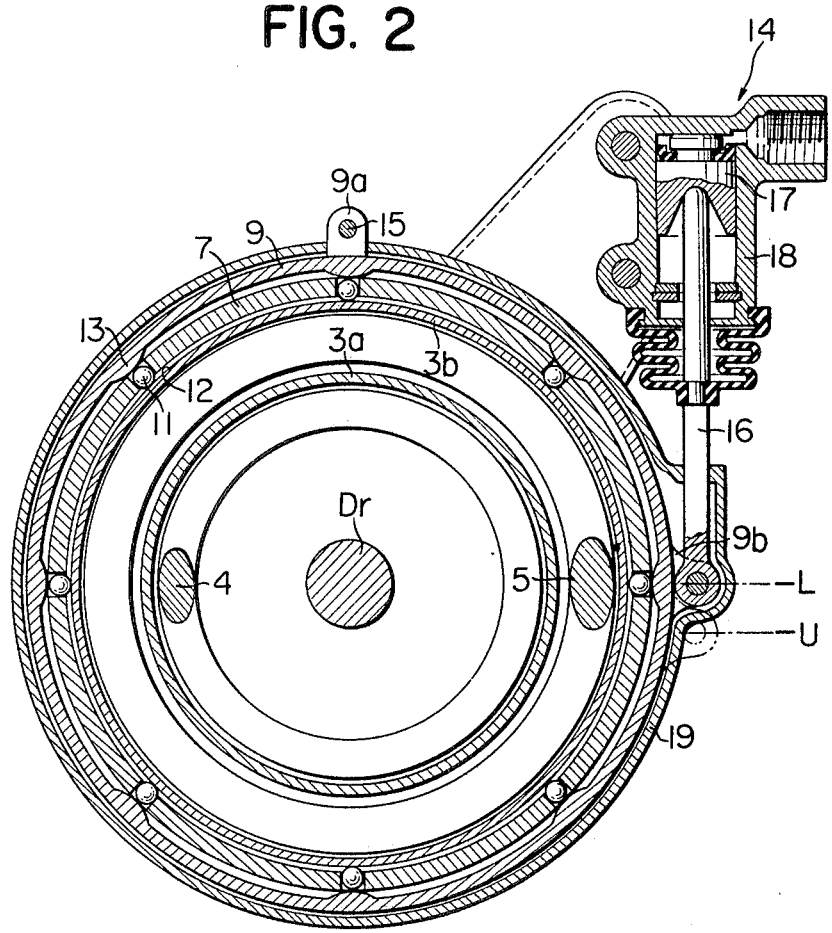
FIG. 2 is a sectional view taken along line 2—2 of FIG. 1.

With regard to the drawings, there is illustrated therein one embodiment of the present invention. Reference character D designates an oil pressure damper of an automobile in which piston rod Dr and cylinder Dc are connected to a body F and to a wheel supporting member (not shown), respectively, so that mutual up and down motion between the body F and wheels may be attenuated.

An upper spring seat 1 is mounted on the body F encircling the piston rod Dr. A lower spring seat 2 opposite thereto is secured to the cylinder Dc, and an upper first coil spring 4 and a lower second coil spring 5, arranged in series through a spring retainer cylinder 3 are interposed, as suspension springs, between the spring seats 1 and 2. While in the illustrated embodiment the spring retainer cylinder 3 is composed of an inner cylinder 3a which supports the lower end of the first coil spring 4 and an outer cylinder 3b which bears on the lower surface of an upper end flange 6 to support the upper end of the second coil spring 5, it should be noted that these elements may be integrally formed.

A fixed sleeve 7, secured to the upper spring seat 1, slidably engages the outer peripheral portion of the outer cylinder 3b, and a lock ring 9 located by a pair of upper and lower stopper rings 8 and 8' rotatably slip against the outer periphery of the sleeve 7.

A plurality of ball retaining holes 10 are bored in the fixed sleeve 7 in circumferentially equally spaced relation to respectively receive therein lock balls 11 having a diameter larger than the wall thickness of the fixed sleeve 7. Annular lock recesses 12 with which these lock balls 11 may engage are formed in the outer peripheral surface of the outer cylinder 3b. Pressing protrusions 13 are provided by which said lock balls 11 may be simultaneously pressed inwardly, that is, towards the lock recesses 12 which extend from the inner peripheral surface of the lock ring 9. Thus, the pressing protrusions 13 press the lock balls 11 when the lock ring 9 is turned to its locked position L, as shown, and release the lock balls 11 when turned to its unlocked position U. Accordingly, the fixed sleeve 7 which retains the lock balls 11, the lock ring 9 provided with the pressing protrusions 13, and the lock recesses 12 in the spring retaining cylinder 3, constitute a lock device which is a central feature of the present invention.

The lock ring 9 is connected to a turning device 14 which is capable of turning the ring to the aforementioned locked position L and the unlocked position U. The turning device 14 comprises a turning spring 15 retained between a lug 9a, disposed on one side of the lock ring 9, a projection 7a disposed on the fixed sleeve 7, and a slave cylinder 18 having a piston 17 connected to the other lug 9b of the lock ring 9 through an operating rod 16. The turning spring 15 is designed to turn the lock ring 9 towards the locked position L, which lock position is controlled by the piston 17 which bears on the end wall of the slave cylinder 18. When supplied with pressure oil from an oil pressure source (not shown), the slave cylinder 18 causes the piston 17 to advance so that the lock ring 9 may be turned to the unlocked position U.

In the figures reference numeral 19 designates a dust guard cover encircling the lock ring 9, the cover being rotated together with the ring, and numeral 20 designates a dust guard expansion boot for protecting a sliding area between the fixed sleeve 7 and the spring retaining cylinder 3.

The operation of the above emodiment is as follows: In a case where a low spring constant is required, the piston 17 of the slave cylinder 18 is operated under oil pressure as previously mentioned in order to turn the lock ring 9 to the unlocked position U and hold it thereat, thereby releasing the lock balls 11 from the pressing protrusions 13 so that each of the balls is slipped out of the lock recess 12 in the spring retaining cylinder 3 in order to render the latter free. Thus, the spring retaining cylinder 3 may be freely moved up and down within the fixed sleeve 7 so that the series-arranged first and second coil springs 4 and 5 support a downwardly-directed load of the body F, that is, serve as suspension springs. In this manner, the effective length of the suspension spring becomes largest to obtain the low spring constant.

In a case where a high spring constant is required, the working oil pressure of the piston 17 is released so that the lock ring 9 is urged from the turning spring 15 towards the locked position L. The lock balls 11 are then pressed inwardly by the pressing protrusions 13. Hence, if the lock recesses 12 of the spring retaining cylinder 3 are placed in registration with the positions of the lock balls 11, they will immediately engage the lock recesses 12 to bind the spring retaining cylinder 3 at the fixed sleeve 7 (as shown in the drawing). As a result, the first coil spring 4, whose lower end is supported on the spring retaining cylinder 3, stops its function and only the second coil spring 5 operates as the suspension system. In this manner the effective length of the suspension system becomes smallest to obtain the high spring constant.

In this case, the tendency of the lock balls 11 to coincide with the lock recesses 12 may be enhanced by the following methods: During the stoppage of the vehicle, the body F may be oscillated intentionally to thereby expand the coil springs 4 and 5 to impart vertical vibrations to the spring retaining cylinder 3. In addition, during the running of the vehicle, the coil springs 4 and 5 may be expanded and contracted by the impact force from the road surface, thereby causing vertical movement of the spring retaining cylinder 3. The most desirable method, however, is to employ a device for automatically adjusting the height of body capable of continuously retaining the body at a given level so that the lock balls 11 and lock recesses 12 will coincide at a given level of the body.

While in the above embodiment, two coil springs 4 and 5 are used as suspension springs, it should be appreciated that more than two such springs may be used to successively find a plurality of spring retaining cylinders interposed between these springs. By this method the spring constant can be varied in a multi-stage fashion.

According to the present invention, the suspension springs are composed of at least two coil springs arranged in series through the spring retaining cylinder, and the vertical movement of the spring retaining cylinder may be restricted or released in order to suitably alter the effective length of the suspension springs. Thusly, the spring constant may be freely changed by varying the effective length of the suspension springs and, accordingly, it is possible to select a spring constant suitable for (1) a particular number of passengers, (2) the running speed, and (3) the condition of road surface and the like, to attain both passenger comfort and stability of steering.

While there have been herein shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

We claim:

1. A suspension spring system for moderating the relative motion between a vehicle body and its wheel supporting members, comprising:
    (a) a first suspension coil having an upper end in abutment with said vehicle body;
    (b) a second suspension coil having a lower end in abutment with said wheel supporting members;
    (c) a spring retaining member disposed between said first and second coils and connecting said coils in series relation; and
    (d) locking means actuable to lock said spring retaining member against movement relatively to said vehicle body for eliminating the spring constant of said first coil.

2. The suspension system as recited in claim 1 in which said system further comprises:
    (a) a fixed sleeve secured to said vehicle body, said sleeve slidably engaged with said spring retaining cylinder; and
    (b) said limiting means comprises:
        (i) ball retaining means bored in said fixed sleeve;
        (ii) lock balls received in said ball retaining means, said lock balls having a diameter larger than the thickness of a side wall of said fixed sleeve; and
        (iii) annular lock recess means formed within an outer peripheral surface of said spring retaining cylinder such as to engage said lock balls.

3. The suspension system as recited in claim 2 in which said system further comprises:
    a lock ring rotatably fittable over the outer periphery of said fixed sleeve and rotatably fittable around said fixed sleeve to assume a lock position,
    whereby said lock balls, when brought into engagement with said lock recess means become secured and, when disengaged from said recess means, become free, thereby permitting the selectable engagement and disengagement of the series coils in order to obtain a composite spring constant suitable to any particular loading mode of the vehicle.

4. The suspension system as recited in claim 3 in which said system further comprises:
    a hydraulically operated turning device connected to said lock ring, said turning device adapted for turning said lock ring to said locked position or, alternatively, to said unlocked position.

* * * * *

UNITED STATES PATENT AND TRADEMARK OFFICE
CERTIFICATE OF CORRECTION

PATENT NO. : 4,248,410

DATED : February 3, 1981

INVENTOR(S) : SANO ET AL

It is certified that error appears in the above–identified patent and that said Letters Patent are hereby corrected as shown below:

On The Title Page Insert:

-- [30] Foreign Application Priority Data
July 14, 1978 [JP] Japan ... 53/85844 --.

Signed and Sealed this

Twenty-sixth Day of May 1981

[SEAL]

*Attest:*

RENE D. TEGTMEYER

*Attesting Officer*   *Acting Commissioner of Patents and Trademarks*